United States Patent Office 3,070,611
Patented Dec. 25, 1962

3,070,611
3-OXIMES AND 3,22-BISOXIMES OF 20-CHOL-4-ENES
William J. Wechter, Kalamazoo, Mich., assignor to The Upjohn Company, Kalamazoo, Mich., a corporation of Michigan
No Drawing. Filed Oct. 20, 1961, Ser. No. 146,435
8 Claims. (Cl. 260—397)

This invention is concerned with novel steroid oximes and bisoximes and more particularly with the 3-mono-oximes of 22-hydroxybisnor-20β-chol-4-en-3-one, 22-hydroxybisnor-20α-chol-4-en-3-one, 20 methyl-4-pregnen-3-one and the 3,22-bisoximes of 3-ketobisnor-20β-chol-4-en-22-al, and 3-ketobisnor-20α-chol-4-en-22-al.

The novel compounds and process of the present invention are illustratively represented by the following formulae:

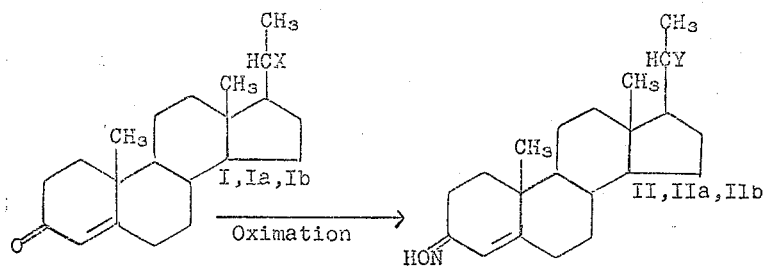

wherein X is selected from the group consisting of α-CH₂OH, β-CH₂OH, α-CHO, β-CHO and β-CH₂R, wherein R is selected from the group consisting of hydrogen and the acyl radical of a hydrocarbon carboxylic acid containing from one to twelve carbon atoms, inclusive; Y is selected from group consisting of α-CH=NOH, β-CH=NOH, α-CH₂OH, β-CH₂OH and β-CH₂R, wherein R is as above.

The 3-mono-oxime compounds of this invention occur in their 3-syn form, 3-anti form and as mixtures of these two isomers. The 3,22-bisoximes occur in their 3-syn-22-syn, 3-syn-22-anti, 3-anti-22-syn and 3-anti-22-anti forms and as mixtures of these isomers. Illustratively, the 3,22-bisoximes of 3-ketobisnor-20β-chol-4-en-22-al (II) have the following configurations:

In this specification and claims, the term HON= when attached to the 3-carbon atom of the steroid nucleus, denotes the 3-syn form, the 3-anti form and mixtures thereof; when attached to both the 3- and 22-carbon atoms, it signifies the 3-syn-22-syn, 3-syn-22-anti, 3-anti-22-syn and 3-anti-22-anti forms and mixtures thereof.

The compounds of the present invention, i.e., 22-hydroxy bisnor-20β-chol-4-en-3-one 3-oxime (IIa), 22-hydroxybisnor-20α-chol-4-en-3-one 3-oxime (IIa), 20-methyl-4-pregnen-3-one 3-oxime (IIb), 3-ketobisnor-20β-chol-4-en-22-al 3,22-bisoxime (II) and 3-ketobisnor-20α-chol-4-en-22-al 3,22-bisoxime (II), are central nervous system depressants, useful as tranquilizers, anti-convulsants, muscle relaxants and sedatives in the treatment of hypertension, nervous disorders and related illnesses in both humans and valuable domestic animals. They also exhibit anti-inflammatory and antibacterial properties.

These compounds exist and can be used in both hydrated and anhydrous forms.

The compounds of the present invention can be prepared and administered to mammals, birds, humans, and animals in a wide variety of oral and parenteral dosage forms, singly or in a mixture with other coacting compounds. They can be associated with a carrier which can be a solid material or liquid, in which the compound is dissolved, dispersed or suspended. The solid composition can take the form of tablets, powders, capsules or the like, preferably in unit dosage forms for simple administration or precise dosages. In such compositions, for the 3-mono-oximes, either the 3-syn or 3-anti isomers or equilibrium mixtures thereof can be used; for the 3,22-bisoximes, the 3-syn-22-syn, 3-syn-22-anti, 3-anti-

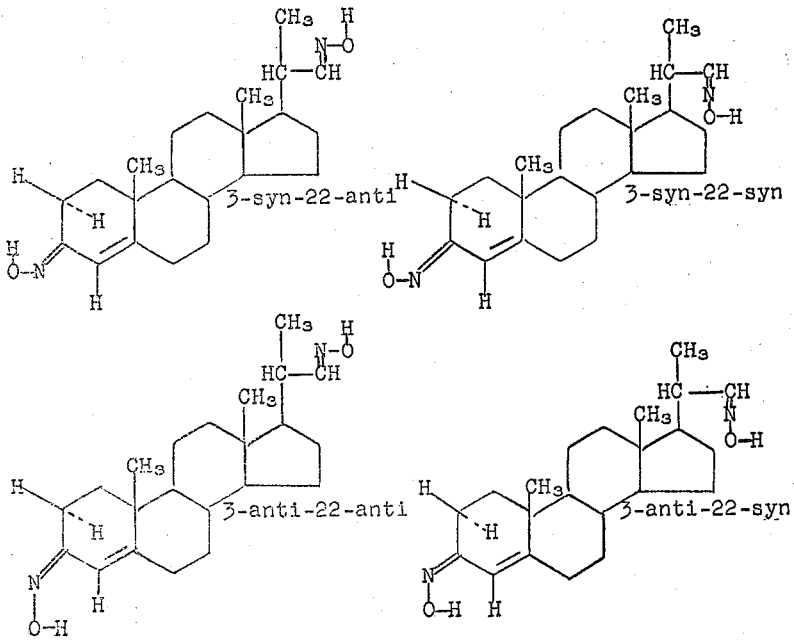

22-syn and 3-anti-22-anti isomers or equilibrium mixtures thereof can be employed.

The 3-mono-oxime compounds (IIa and IIb) of the present invention are prepared from their corresponding 3-keto compounds (Ia and Ib) by 3-mono-oximation, i.e., by reaction with hydroxylamine or hydroxylamine mineral acid salts such as hydroxylamine hydrochloride. The starting materials employed in the process for preparing the novel 3-mono-oximes of the present invention are 22-hydroxybisnor-20β-chol-4-en-3-one (Ia), 22-hydroxybisnor-20α-chol-4-en-3-one (Ia) and 20-methyl-4-pregnen-3-one (Ib), produced in the manner set forth below in part (a) of Examples 3, 4 and 5, respectively.

The 3,22-bisoximes (II) of this invention are prepared from their corresponding 3-keto-22-al compounds (I) by 3,22-dioximation, i.e., by reaction with hydroxylamine or hydroxylamine mineral acid salts such as hydroxylamine hydrochloride. The starting materials employed in the process for preparing the novel 3,22-bisoximes are 3-ketobisnor-20β-chol-4-en-3-one-22-al (I) and 3-ketobisnor-20α-chol-4-en-3-one-22-al (I), obtained by the procedures described by Heyl and Herr in J. Amer. Chem. Soc. 74, 3627 (1952).

The 3-mono-oximation process of the present invention comprises treating a compound selected from one of the starting materials represented by Formulae Ia and Ib, above, with a mineral acid salt of hydroxylamine such as hydroxylamine hydrochloride or hydroxylamine sulfate in a suitable solvent such as (1) an alkanol, for example methanol, ethanol, propanol, isopropanol, butanol or (2) a tertiary amine, for example, pyridine, collidine, N,N-dimethylaniline and the like, or preferably (3) an alcohol in the presence of a basic reagent such as a tertiary amine, sodium or potassium hydroxides, carbonates or acetates, to give the corresponding 3-mono-oxime. In carrying out this 3-oximation process, an excess of hydroxylamine salt usually from two to six molar equivalents is preferably employed. Alternatively, hydroxylamine itself can be used in place of the hydroxylamine salt and base.

The 3-mono-oximation reaction is preferably carried out at 20 to 120° C., and conveniently at the reflux temperature of the reaction mixture. Under these conditions the reaction time is usually from 15 minutes to 8 hours. Both higher and lower temperatures and shorter and longer reaction times are operative, the lower temperature usually requiring a correspondingly longer reaction time.

The 3-mono-oximes of 22-hydroxybisnor-20β-chol-4-en-3-one (IIa), 22-hydroxybisnor-20α-chol-4-en-3-one (IIa) and 20-methyl-4-pregnen-3-one (IIb), thus produced, can be isolated from the reaction mixture by conventional methods, for example, when a water-miscible solvent is used, by pouring the reaction mixture into water and separating the resultant precipitate by filtration. Additional purification of the product can be accomplished by conventional methods, for example, by elution chromatography from an adsorbent column with a suitable solvent or mixture of solvents such as, acetone, methanol, dilute methanol, ethanol, ether, methylene chloride Skellysolve B (hexanes) also by gradient elution chromatography from an adsorbent column with a suitable mixture of solvents, such as, methylene chloride-Skellysolve B acetone-Skellysolve B, and the like.

The mixtures of syn and anti isomers obtained in the above-disclosed 3-mono-oximation process or by equilibration of these products, can be separated by procedures known in the art for isolating components of mixtures of geometrical isomers, for example, by fractional crystallization, chromatography, selective leaching, or a combination of these methods.

The 3,22-dioximation process of the present invention is carried out in the same manner as disclosed above for the 3-mono-oximation process, except that the starting materials treated are those represented by Formula I, i.e., 3-ketobisnor-20β-chol-4-en-22-al and 3-ketobisnor-20α-chol-4-en-22-al. The 3,22-dioximation process yields the 3,22-bisoximes of 3-ketobisnor-20β-chol-4-en-22-al (II) and 3-ketobisnor-20α-chol-4-en-22-al (II). The thus produced 3,22-bisoximes (II) are isolated and purified in the same manner as disclosed above for the 3-mono-oximes represented by Formulae IIa and IIb. The mixtures of 3-syn-22-syn, 3-syn-22-anti, 3-anti-22-syn and 3-anti-22-anti isomers obtained by the 3,22-dioximation process or by equilibration of these products, can be separated by procedures known in the art for isolating components of mixtures of geometrical isomers, for example, by fractional crystallization, chromatography, selective leaching, or a combination of these methods.

EXAMPLE 1

*3-Ketobisnor-20β-Chol-4-En-22-Al 3,22-Bisoxime (II)*

69 g. of 3-ketobisnor-20β-chol-4-en-22-al (I) (Heyl and Herr, J. Amer. Chem. Soc. 74, 3627 [1952]) was suspended in 500 ml. of alcohol and heated to reflux and a solution of 35 g. of hydroxylamine hydrochloride and 51.5 g. of sodium acetate in 100 ml. of water added thereto. Heating of the reaction mixture was continued for a period of about two hours after which the hot solution was poured, with stirring, into 2 l. of water. Following refrigeration for about 3 hours, the product was filtered, washed with 1.5 l. of water and dried in vacuo overnight at about 60° C. to give 70.9 g. of light colored, crystalline 3-ketobisnor-20β-chol-4-en-22-al 3,22-bisoxime (II). This compound had a melting point of 131 to 135° C. (decomposition), $\lambda_{max.}$ 240 m$\mu$ ($\epsilon$=21,400), $[\alpha]_D$ (ethanol) plus 109° and 0.0 water (Karl Fischer). Its nuclear magnetic resonance spectrum showed the bioxime configuration to be 66%±5% 3-syn and 73%±5% 22-syn. The infrared spectrum of the compound was in agreement with its expected structure.

*Anal.*—Calcd. for $C_{22}H_{34}O_2N_2$: C, 73.70; H, 9.56; N, 7.81. Found: C, 73.21; H, 9.70; N, 7.27.

The crude equilibrium mixture of Example 1 can be separated by combinations of recrystallization from a mixture of acetone and water and chromatography, in the manner described in U.S. applications S.N. 40,143, filed July 1, 1960, now Patent No. 3,019,242, to give:

(1) the 3-syn-22-anti isomer of 3-ketobisnor-20β-chol-4-en-22-al 3,22-bisoxime;
(2) the 3-syn-22-syn isomer of 3-ketobisnor-20β-chol-4-en-22-al 3,22-bisoxime;
(3) the 3-anti-22-syn isomer of 3-ketobisnor-20β-chol-4-en-22-al 3,22-bisoxime and
(4) the 3-anti-22-anti isomer of 3-ketobisnor-20β-chol-4-en-22-al 3,22-bisoxime.

EXAMPLE 2

*3-Ketobisnor-20α-Chol-4-En-22-Al 3,22 Bisoxime (II)*

8.6 g. of 3-ketobisnor-20α-chol-4-en-22-al (I) (J. Amer. Chem. Soc. 74, 3627 [1952]) dissolved in 225 ml. of alcohol was treated with 5 g. of hydroxylamine hydrochloride and 6 g. of sodium acetate dissolved in 20 ml. of water. The reaction mixture was heated to reflux for a period of about 2 hours after which the hot solution was poured, with stirring, into 250 ml. of water. Following refrigeration for about 3 hours, the product was filtered, washed with 20 ml. of water and dried in vacuo overnight at about 60° C. to give 9.23 g. of light-colored crystalline product with a melting point of 125 to 140° C. (decomposition). Its nuclear magnetic resonance spectrum showed the bisoxime configuration to be 60%±5% 3-syn and 79%±5% 22-syn; the infrared spectrum of the compound was in agreement with its expected structure. A sample was recrystallized once from a mixture of acetone and water to yield pure, light colored, crystalline 3-ketobisnor-20α-chol-4-en-22-al 3,22- bisoxime (II) with a melting point of 95° C. (foaming) and $$\lambda_{max.}^{ethanol}\ 241\ m\mu\ (\epsilon = 20,650)$$

*Anal.*—Calcd. for $C_{22}H_{34}O_2N_2$: C, 73.70; H, 9.56; N, 7.81. Found: C, 73.70; H, 9.56; N, 7.59.

The crude equilibrium mixture of Example 2 can be separated by combinations of recrystallization from a mixture of acetone and water (or alcohol and water) and chromatography, in the manner described in U.S. application S.N. 40,143, filed July 1, 1960, to give:

(1) the 3-syn-22-anti isomer of 3-ketobisnor-20α-chol-4-en-22-al 3,22-bisoxime;
(2) the 3-syn-22-syn isomer of 3-ketobisnor-20α-chol-4-en-22-al 3,22-bisoxime;
(3) the 3-anti-22-syn isomer of 3-ketobisnor-20α-chol-4-en-22-al 3,22-bisoxime and
(4) the 3-anti-22-anti isomer of 3-ketobisnor-20α-chol-4-en-22-al 3,22-bisoxime.

EXAMPLE 3

*22-Hydroxybisnor-20β-Chol-4-En-3-One 3-Oxime (IIa)*

(*a*) 12 l. of a medium consisting of 240 g. of Edamin (an enzymatic digest obtained from Sheffield Farms, New York, New York), 36 g. of corn steep, 600 g. of technical dextrose and tap water sufficient to bring the volume of the medium to 12 l. was adjusted to pH 6.5 with 25% sodium hydroxide solution. The medium was steam sterilized at 15 pounds pressure at 120° C. for 1 hour, cooled to room temperature and inoculated with a week old culture of *Penicillium lilacinum* Thom. (A.T.C.C. 10114; Pe 18). The medium was maintained at 28° C., stirred at 160 r.p.m. and sparged with sterile air introduced at the rate of 1 l./minute. To this culture, there was added, at the start of fermentation, 3 g. of the known compound 3-ketobisnor-4-cholen-22-al (I) dissolved in 100 ml. of acetone. Fermentation was allowed to proceed for a period of 95 hours, at which time the pH of the medium was 6.7. At this juncture, the mycelium and beer were thoroughly extracted with methylene chloride. The extraction of beer and mycelium produced 3.05 g. of solids which were shown by papergram analysis to contain two components in 5% and 22% quantities, respectively. The product was dissolved in 300 ml. of benzene and chromatographed over a column of 150 g. of alumina. The residue obtained by elution with ether containing 5 to 50% chloroform weighed 1.275 g. and was dissolved in 4 ml. of methylene chloride and filtered. The solution was evaporated to 0.5 ml. and addition of 4 ml. of ether thereto produced 916 mg. of light colored crystals. This material was dissolved in 3 ml. of hot ethyl acetate and recrystallized by the addition of 3 ml. of Skellysolve B (hexanes) to give 678 mg. of crystals with a melting point of 143 to 145° C. Further recrystallization from 1.5 ml. of hot ethanol and 2 ml. of ether yielded 247 mg. of 22-hydroxybisnor-20β-chol-4-en-3-one (Ia) with a melting point of 143 to 145° C., $[\alpha]_D^{23}$ plus 98° (in chloroform). The infrared spectrum confirmed the expected structure.

(*b*) 3.6 g. of 22-hydroxybisnor-20β-chol-4-en-3-one (Ia) was suspended in 50 ml. of alcohol and thereto was added a solution containing 2 g. of hydroxylamine hydrochloride and 3 g. of sodium acetate in 10 ml. of water. This reaction mixture was heated to reflux for a period of about 2 hours and about ⅓ of the solvent allowed to distill whereupon the product began crystallization. Following cooling to room temperature, the product was filtered, washed with 50% aqueous ethanol and dried in vacuo overnight at about 60° C. to give 3.12 g. of product with a melting point of 179 to 184° C., and infrared spectrum consistent with the expected 3-oxime structure and nuclear magnetic resonance spectrum indicative of 100% ±5% 3-syn configuration. A sample of the product was recrystallized for analysis from ethanol and water and had a melting point of 179 to 184° C., $\lambda_{max.}$ 250 mμ ($\epsilon = 22,300$) and an infrared spectrum consistent with the predicted structure of 22-hydroxybisnor-20β-chol-4-en-3-one 3-syn-oxime (IIa).

*Anal.*—Calcd. for $C_{22}H_{35}O_2N$: C, 76.47; H, 10.21; N, 4.05. Found: C, 76.79; H, 10.24; N, 4.40.

The crude product (equilibrium mixture) of Example 3 can be separated by combinations of recrystallization from a mixture of acetone and water and chromatography, in the manner described in U.S. application S.N. 40,143, filed July 1, 1960, to give:

(1) the 3-anti isomer of 22-hydroxybisnor-20β-chol-4-en-3-one 3-oxime and
(2) the 3-syn isomer of 22-hydroxybisnor-20β-chol-4-en-3-one 3-oxime.

If the 22-alcohol group of 22-hydroxybisnor-20β-chol-4-en-3-one (Ia) is acylated prior to formation of the 3-oxime, there is thus produced the corresponding 22-acylate 3-oxime. The acylation is performed in the usual manner well known in the steroid art, i.e., employing an acid chloride or bromide, an acid anhydride in pyridine or like amine, an acid in the presence of an esterification catalyst, or an ester under ester exchange reaction conditions. Following the procedure of Example 3, but employing a 22-hydroxybisnor-20β-chol-4-en-3-one 22-acylate (Ia) as starting compound, there is produced an equilibrium mixture from which can be isolated:

(1) the 3-syn isomer of a 22-hydroxybisnor-20β-chol-4-en-3-one 3-oxime 22-acylate and
(2) the 3-anti isomer of a 22-hydroxybisnor-20β-chol-4-en-3-one 3-oxime 22-acylate.

EXAMPLE 4

*22-Hydroxybisnor-20α-Chol-4-En-3-One 3-Oxime (IIa)*

(*a*) 12 l. of a medium consisting of 240 g. of Edamin (an enzymatic digest obtained from Sheffield Farms, New York, N.Y.), 36 g. of corn steep, 600 g. of technical dextrose and tap water sufficient to bring the volume of the medium to 12 l., was adjusted to pH 6 with 25% sodium hydroxide solution. The medium was steam sterilized at 15 pounds pressure at 120° C. for 1 hour, cooled to room temperature and inoculated with a week old culture of *Gliocladium catenulatum* (A.T.C.C. 10,523, Gl-3). The medium was maintained at 28° C., stirred at 200 r.p.m. and sparged with sterile air introduced at the rate of 1 l./minute. At the end of 48 hours of fermentation, 3 g. of the known compound, 3-ketobisnor-4-cholen-22-al (I) was dissolved in 125 ml. of acetone and added to this culture. Fermentation was continued for an additional 24 hour period, at which time the pH of the medium was 5.4, and the mycelium and beer thoroughly extracted with methylene chloride. The extraction of beer and mycelium produced 5.19 g. of solids which were dissolved in 500 ml. of benzene and chromatographed over a column of 150 g. of alumina. Fractions of 300 ml. were collected. The residue obtained by elution with 50% benzene and 50% ether weighing 272 mg., was recrystallized from 1 ml. of acetone and 0.5 ml. of Skellysolve B to yield 272 mg. of a product shown by its infrared spectrum to be 3-ketobisnor-20-iso-4-cholen-22-al (I′). The residue obtained by elution with ether weighing 1.876 g., was recrystallized from a mixture of 10 ml. of ether and 5 ml. of Skellysolve B to give 830 mg. of a new compound with a melting point of 125 to 132° C. A second recrystallization of this product from the same solvent mixture yielded 814 mg. of light-colored crystalline solid with a melting point of 127 to 133° C. Further purification from 3 ml. of ethyl acetate and 1 ml. of Skellysolve B gave 675 mg. of the compound which melted at 134 to 136° C. A final recrystallization from 2 ml. of acetone and 1 drop of water yielded 592 mg. of 22-hydroxybisnor-20α-chol-4-en-3-one (Ia) with a melting point of 133 to 146° C.

(*b*) 0.5 g. of 22-hydroxybisnor-20α-chol-4-en-3-one (Ia) was suspended in 8 ml. of alcohol and thereto was added a solution containing 0.3 g. of hydroxylamine hydrochloride and 0.4 ml. of water. This reaction mixture was heated to reflux for a period of about 2 hours after which the hot solution was poured, with stirring, into 15 ml. of water. Following refrigeration for about 3 hours, the product was filtered, washed with 10 ml. of water and dried in vacuo for about 8 hours at about 60° C. to yield a light colored crystalline solid, 22-hydroxybisnor-20α-chol-4-en-3-one 3-synoxime (IIa).

The crude product (equilibrium mixture) of Example 4 can be separated by combinations of recrystallization from a mixture of acetone and water and chromatography, in the manner described in U.S. application S.N. 40,143, filed July 1, 1960, to give:

(1) the 3-anti isomer of 22-hydroxybisnor-20α-chol-4-en-3-one 3-oxime and
(2) the 3-syn isomer of 22-hydroxybisnor-20α-chol-4-en-3-one 3-oxime.

If the 22-alcohol group of 22-hydroxybisnor-20α-chol-4-en-3-one (Ia) is acylated prior to formation of the 3-oxime, there is thus produced the corresponding 22-acylate 3-oxime. The acylation is performed in the usual manner well known in the steroid art, i.e., employing an acid chloride or bromide, an acid anhydride in pyridine or like amine, an acid in the presence of an esterification catalyst, or an ester under ester exchange reaction conditions. Following the procedure of Example 4, but employing a 22-hydroxybisnor-20α-chol-4-en-3-one 22-acylate (Ia) as starting compound, there is produced:

(1) the 3-syn isomer of a 22-hydroxybisnor-20α-chol-4-en-3-one 3-oxime 22-acylate;
(2) the 3-anti isomer of a 22-hydroxybisnor-20α-chol-4-en-3-one 3-oxime 22-acylate and
(3) the equilibrium mixture of the 3-syn and 3-anti isomers of a 22-hydroxybisnor-20α-chol-4-en-3-one 3-oxime 22-acylate.

EXAMPLE 5

*20-Methyl-4-Pregnen-3-one 3-Oxime (IIb)*

(a) 1 g. of 22-hydroxybisnor-20β-chol-4-en-3-one (Ia) is suspended in 10 ml. of benzene and 3 ml. of ethylene glycol containing 50 mg. of p-toluenesulfonic acid and heated to reflux for a period of about 8 hours, water being separated from the reaction mixture by means of a Dean-Stark trap. The hot solution is treated with 1 ml. of saturated sodium bicarbonate solution and on cooling the benzene solution is washed successively with water, saturated sodium chloride solution and then dried with sodium sulfate. The solvent is removed under reduced pressure and the residue dissolved in 10 ml. of pyridine and treated for a period of about 8 hours with 2 g. of p-toluenesulfonyl chloride. The pyridine solution is poured into 100 ml. of water and the precipitated solid, gummy material dissolved in methylene chloride after decanting the solution of pyridine and water. The methylene chloride solution is washed three times with water, then with saturated sodium chloride solution and dried with sodium sulfate, after which the solvent is evaporated to dryness under vacuum. The resulting residue is dissolved in 5 ml. of purified tetrahydrofuran and the solution added to a suspension of 4 g. of lithium aluminum hydride in 50 ml. of ether; the reaction mixture is then heated to reflux for a period of about 1 hour. The excess lithium aluminum hydride is destroyed by the addition of water; the ether solution is washed thoroughly with dilute hydrochloric acid, water, dried with sodium sulfate and then evaporated to dryness by distillation on a steam bath. The residue is taken up in 10 ml. of alcohol and treated with 1 ml. of dilute hydrochloric acid at room temperature for a period of about 8 hours. The alcohol and hydrochloric acid are removed under reduced pressure; the residue is dissolved in methylene chloride, washed successively with water, dilute sodium bicarbonate solution, again with water, and dried. The methylene chloride solution is then adsorbed on a 50 g. chromatographic column of Florisil (synthetic magnesium silicate) previously treated with Skellysolve B, and the product eluted by gradient elution chromatography with solvent mixtures of from 2% to 10% of acetone in Skellysolve B. The crystalline product is recrystallized from mixtures of acetone and Skellysolve B or alcohol and water to yield pure light colored crystalline 20-methyl-4-pregnen-3-one (Ib).

(b) 0.5 g. of 20-methyl-4-pregnen-3-one (Ib) is suspended in 8 ml. of alcohol and thereto is added a solution containing 0.3 g. of hydroxylamine hydrochloride and 0.4 ml. of water. This reaction mixture is heated to reflux for a period of about 2 hours after which the hot solution is poured, with stirring, into 15 ml. of water. Following refrigeration for a period of about 3 hours, the product is filtered, washed with 10 ml. of water and dried under vacuum for about 8 hours at a temperature of about 60° C. to yield a light colored crystalline solid, 20-methyl-4-pregnen-3-one 3-syn-oxime (IIb).

The crude product (equilibrium mixture) of Example 5 can be separated by combinations of recrystallization from a mixture of acetone and water and chromatography, in the manner described in U.S. application S.N. 40,143, filed July 1, 1960, to give:

(1) the 3-anti isomer of 20-methyl-4-pregnen-3-one 3-oxime and
(2) the 3-syn isomer of 20-methyl-4-pregnen-3-one 3-oxime.

I claim:
1. Compounds of the formula

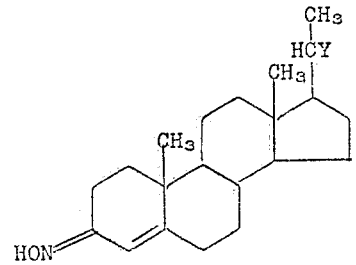

wherein Y is selected from the group consisting of α-CH=NOH, β-CH=NOH, α-CH₂OH, β-CH₂OH and β-CH₂R, wherein R is selected from the group consisting of hydrogen and the acyloxy radical of a hydrocarbon carboxylic acid containing from one to twelve carbon atoms, inclusive.

2. 3-ketobisnor-20β-chol-4-en-22-al 3,22-bisoxime.
3. 3 ketobisnor-20α-chol-4-en-22 al 3,22-bisoxime.
4. 22-hydroxybisnor-20β-chol-4-en-3-one 3-oxime.
5. 22-hydroxybisnor-20α-chol-4-en-3-one 3-oxime.
6. 22-hydroxybisnor-20β chol-4-en-3-one 3-oxime 22-acylate wherein the acyl radical is that of a hydrocarbon carboxylic acid containing from one to twelve carbon atoms, inclusive.
7. 22-hydroxybisnor-20α-chol-4-en-3-one 3-oxime 22-acylate wherein the acyl radical is that of a hydrocarbon carboxylic acid containing from one to twelve carbon atoms, inclusive.
8. 20-methyl-4-pregnen-3-one 3-oxime.

References Cited in the file of this patent

UNITED STATES PATENTS 2,628,966   Graber et al. _____ Feb. 17, 1953

OTHER REFERENCES

Gilman: Organic Chemistry, vol. 1, page 652, 1953, John Wiley and Sons, New York.
Oliveto et al.: J.A.C.S. 78 pages 1736–37 (1956).